(12) United States Patent
Boerup

(10) Patent No.: US 11,079,663 B1
(45) Date of Patent: Aug. 3, 2021

(54) ELEMENT FOR MODULAR ATTACHMENT OF CAMERA ACCESSORIES

(71) Applicant: MGMD BRAINPOWER LLC, Tucson, AZ (US)

(72) Inventor: Spencer Boerup, Tucson, AZ (US)

(73) Assignee: MGMD BRAINPOWER LLC, Tucson, AZ (US)

(*) Notice: Subject to any disclaimer, the term of this patent is extended or adjusted under 35 U.S.C. 154(b) by 94 days.

(21) Appl. No.: 16/040,270

(22) Filed: Jul. 19, 2018

Related U.S. Application Data

(63) Continuation of application No. 14/503,705, filed on Oct. 1, 2014, now Pat. No. 10,054,846.

(60) Provisional application No. 61/887,144, filed on Oct. 4, 2013.

(51) Int. Cl.
   *G03B 17/56* (2021.01)
   *F16M 13/02* (2006.01)

(52) U.S. Cl.
   CPC .......... *G03B 17/566* (2013.01); *F16M 13/02* (2013.01); *G03B 17/565* (2013.01)

(58) Field of Classification Search
   CPC .......... G02B 7/02; G02B 7/021; G02B 7/026; G03B 15/0442; G03B 15/0457; G03B 15/0489; G03B 17/566; G03B 17/565; F21K 5/02; F21K 5/023; F16M 13/02
   See application file for complete search history.

(56) References Cited

U.S. PATENT DOCUMENTS

| | | | | |
|---|---|---|---|---|
| 4,380,787 A | * | 4/1983 | Stone | G03B 15/05 362/16 |
| 6,234,638 B1 | * | 5/2001 | Beverly | G03B 15/06 362/16 |
| 7,978,971 B1 | * | 7/2011 | Honl | G03B 15/02 396/198 |
| 8,014,654 B2 | * | 9/2011 | Karle | F21V 17/06 396/4 |
| 2008/0316754 A1 | * | 12/2008 | Lau | G03B 15/00 362/322 |
| 2014/0355200 A1 | * | 12/2014 | Thiers | F16M 11/041 361/679.41 |
| 2015/0355431 A1 | * | 12/2015 | Garvey | G02B 7/003 359/819 |

* cited by examiner

*Primary Examiner* — Joseph P Martinez
*Assistant Examiner* — Vipin Patel

(57) ABSTRACT

A camera accessory mounting element includes attachment elements configured to mount to a component of a camera, such as a lens or a flash device. One or more peripheral devices may be attached to the camera accessory mounting element using attachment elements such as magnets. Peripheral devices include a grid, a light directing dish, a lens hood, a lens adaptor, a step-ring, a lens filter, a lens extension tubes, a light diffusers, a light filter, and a light directing device.

21 Claims, 10 Drawing Sheets

ELEMENT FOR MODULAR ATTACHMENT OF CAMERA ACCESSORIES

RELATED APPLICATIONS

This application is a continuation of U.S. Non-Provisional application Ser. No. 14/503,705, filed Oct. 1, 2014, which claims priority to and the benefit of U.S. Provisional Application No. 61/887,144, filed Oct. 4, 2013, the disclosures of which are hereby incorporated by reference herein in their entirety.

INTRODUCTION

To aid in the use of cameras, peripheral devices may be used. Some peripheral devices attach to the lens and/or flash equipment of cameras. Devices that may be attached to a lens include lens hoods, lens adaptors, step-rings, lens filters, and lens extension tubes. Devices that may be attached to flash equipment include light diffusers, light filters, and light directing devices.

Attaching peripheral devices to cameras presents challenges. For example, certain attachment mechanisms require the use of straps and bulky equipment. The straps are easily lost, and some users find the use of straps clumsy and difficult to use.

Other attachment mechanisms are made of a rigid material that is manufactured for a specific make of camera lens or camera flash. These mechanisms are not interchangeable among makes of multiple camera lenses and camera flashes.

Further, current attachments allow only for one device to be attached to a camera element at a time. This configuration prevents multiple peripheral devices (e.g., filters and diffusers) from being attached to a single piece of flash equipment.

It is with respect to these and other considerations that the technologies described below have been developed. Also, although relatively specific problems have been discussed, it should be understood that the embodiments should not be limited to solving the specific problems identified in the introduction.

Camera Accessory Mounting Element

The technology relates to a camera accessory mounting element with attachment elements configured to mount to components of a camera, such as a lens or a flash device. One or more peripheral devices may be attached to the camera accessory mounting element using attachment elements such as magnets. Peripheral devices may include a grid, a light directing dish, a lens hood, a lens adaptor, a step-ring, a lens filter, a lens extension tubes, a light diffusers, a light filter, and a light directing device. Other peripheral devices are contemplated.

An apparatus for attaching one or more peripheral devices to a camera is disclosed. The apparatus includes a body having an interior wall defining an opening. The body may be configured to flexibly deform and have an attachment element secured to the body.

Further, a light directing device adapted to couple to an apparatus is disclosed. The light direct device may be used for attaching one or more peripheral devices to a camera. The light directing device may have frustoconical hollow body The frustoconical hollow body may include a base end of the hollow body, a light directing end of the hollow body, an interior portion designed to direct light from the base end to the light directing end, and an attachment element secured to the base end of the hollow body.

Additionally, a method of mounting an accessory to a camera is disclosed. The method includes stretching a camera accessory mounting device such that an opening of the camera accessory mounting element will receive a portion of the camera, inserting the portion of the camera into the opening, and releasing the camera accessory mounting device from the stretched position.

BRIEF DESCRIPTION OF THE DRAWINGS

Non-limiting and non-exhaustive embodiments are described with reference to the following figures.

DETAILED DESCRIPTION

As used in this disclosure, a camera is an optical instrument that records images. The images may be stored locally, transmitted to another location, or both. These images may be still photographs or moving images such as videos or movies. The medium upon which the images are stored may be video tape, digital media (RAM, ROM, CD, solid state drives, etc.), film, or any other now known or later developed medium suitable for storing images.

Figure 1A:
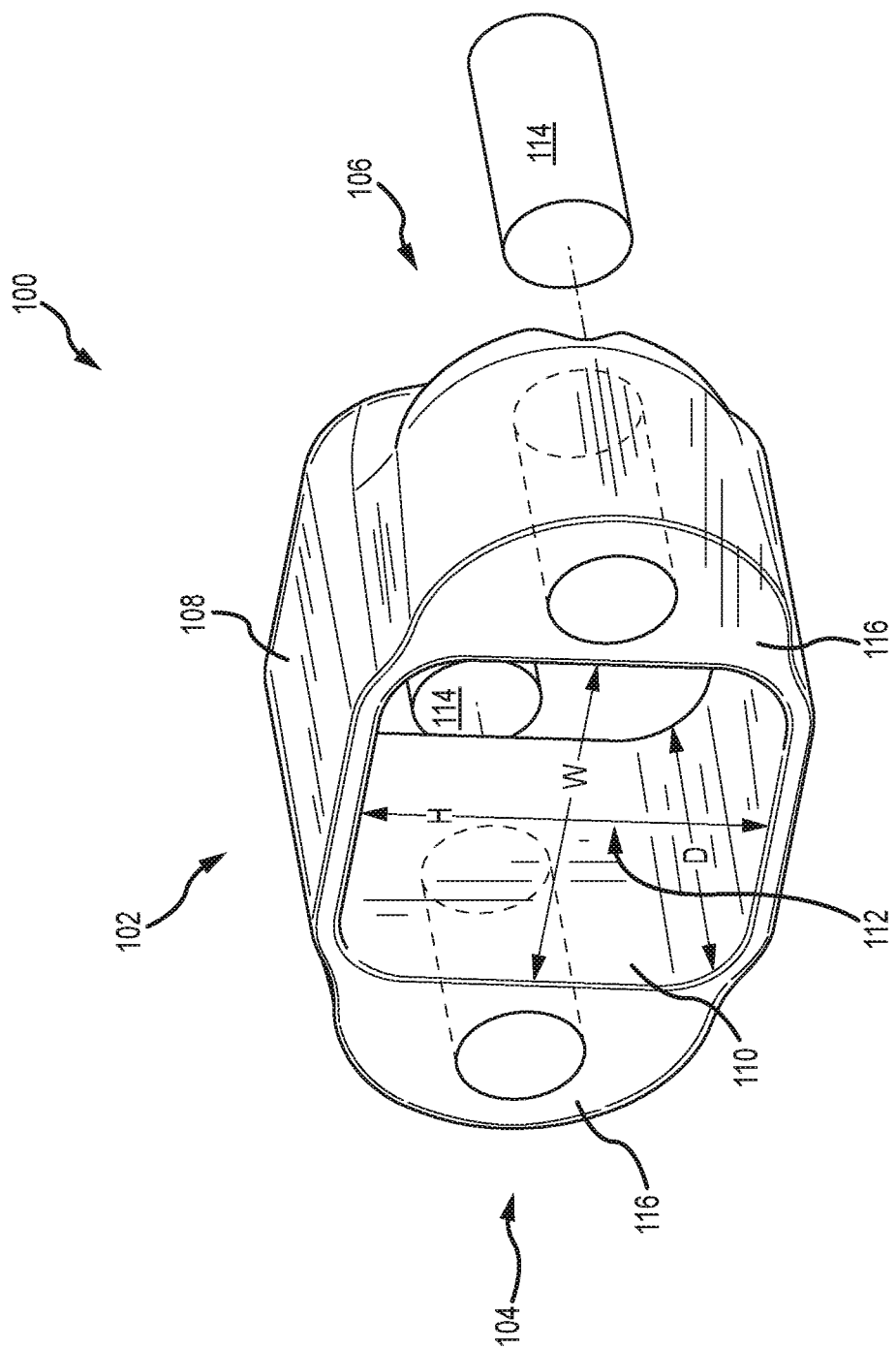
FIG. 1A illustrates an embodiment of a camera accessory mounting element.
Figure 1B:
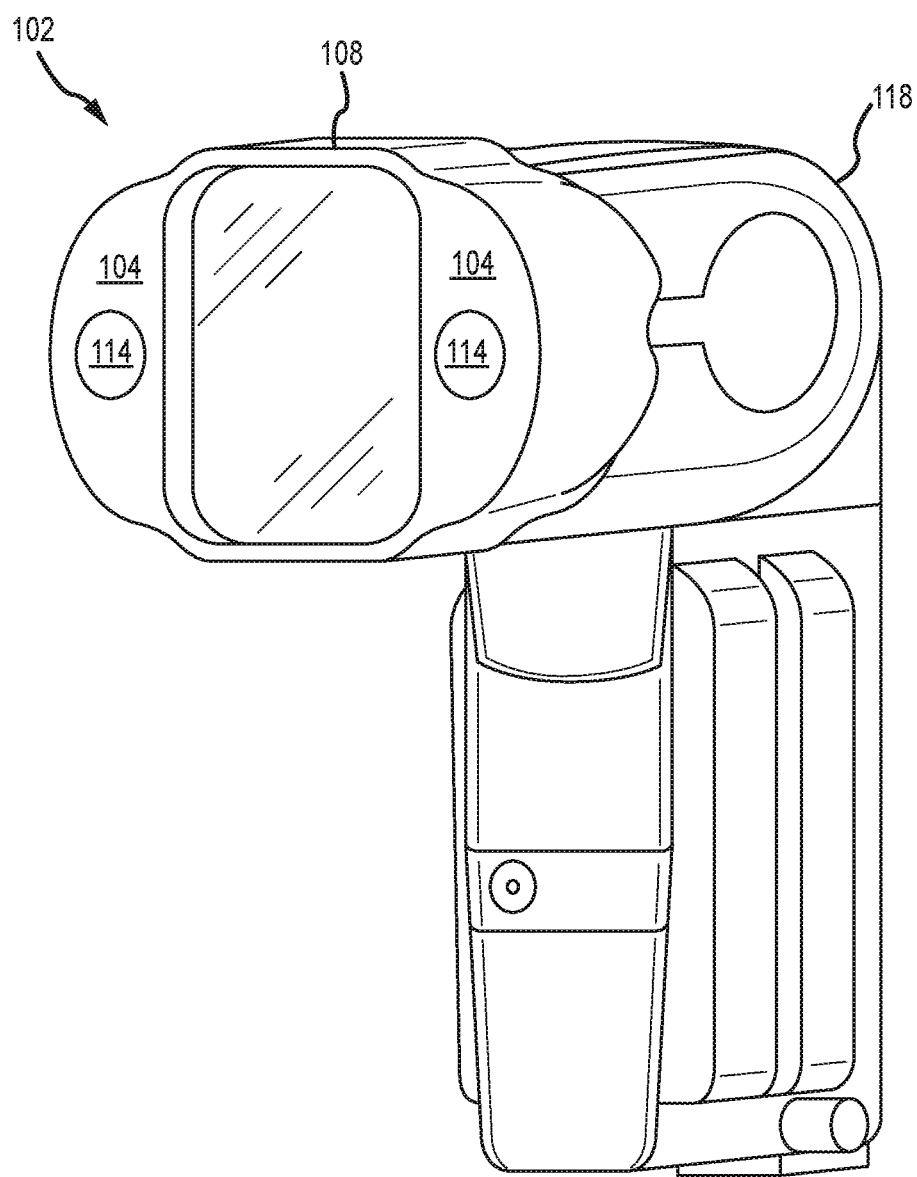
FIG. 1B illustrates an embodiment of a camera accessory mounting element in an environment.

With reference to FIG. 1A and FIG. 1B, each illustrates an embodiment of a camera accessory mounting element 100, with FIG. 1B illustrating an embodiment of a camera accessory mounting element attached to a camera flash. FIGS. 1A and 1B illustrate a body 102 having a face 104, a base 106, an exterior wall 108, and an interior wall 110 that defines an opening 112. Additionally, a camera accessory mounting element 100 includes an attachment element 114. In an embodiment, the attachment element 110 is disposed in a housing element 116.

As illustrated, the body 102 is of a unitary construction. The body 102 may be configured such that it can elastically deform to attach to various parts of a camera. In an embodiment, the body 102 is made of a material that has an elastic property, such that it can deform or stretch during use but substantially return to its original shape. For example, the body 102 is in the form of a stretchable, flexible band. Accordingly, the body 102 may be made from silicone, polyurethane, neoprene, rubber, elastomeric, elastic, elastic polymer, flexible rubber, or any other suitable material now known or later developed. In other embodiments, the body is rigid. Still in others, the body has portions that are flexible and portions that are rigid.

In certain embodiments, the body need not be a unitary construction, but may be made of various types of materials. For example the body may have rigid elements. Such an embodiment may include a flexible body with rigid elements affixed to the face of the body. These rigid portions may be used as an attachment element. Other examples include using rigid elements to provide structural support to the body.

FIG. 1A additionally illustrates an exterior wall 108 and an interior wall 110. The body 102 may include one or more interior walls 110 that define an opening 112. For example, the body 102 may have a single interior wall 110, which may form a substantially circular or oval shaped opening 112. In another embodiment, the single interior wall 110 may form a rectangular shaped opening 112 with rounded corners. Still in other embodiments, there may be multiple interior walls 110 such that it forms a square opening 112, a hexagonal opening 112, or another polygonal shaped opening 112.

The opening 112 is defined by a height H, a width W, and a depth D. In an embodiment, the height of the opening 112 may be about 1.5 inches, the width may be about 2 inches, and the depth may be about 0.7 inches. In embodiments where the body is flexible, the dimensions may be stretched from the original dimensions. Other dimensions are contemplated.

FIG. 1B illustrates an attached configuration of body 102. In an embodiment, the use of flexible materials in the body 102 allows the camera accessory mounting element 100 to be used with camera elements each having a variety of forms such as lenses, flash equipment, etc. For example, the body 102 is flexible, which allows the body to stretch to fit a component 118 of a camera. Additionally, a user may stretch the body 102, orientate the body 102 so that a camera component 118 fits into the opening 112 of a body, and then release the body 102. This allows the body 102 to form a robust connection to the component 118 to which it is mounted. Such a configuration may allow the body 102 to mount to a variety of camera component designs. Camera components include lenses and flash equipment.

As illustrated in FIG. 1B, the body 102 has been stretched to fit over a component 118 that is a flash component of a camera. One way to place a body 102 on a component 118 of a camera, such as the light of the flash equipment, is to stretch the body 102 and dispose the component 118 of the camera in the opening 112. The body 102 compresses around the component 118 of the camera to form a robust connection with the component 118.

Additionally, FIG. 1B illustrates the face 104. The face 104 is adapted to face outwardly from the component 118, while the base 106 is proximate to the component 118. Though FIG. 1B illustrates the body 102 attached to a flash device of a camera, a body may be attached to other portions of the camera including the lens of a camera.

Additionally, FIGS. 1A and 1B illustrate an attachment element 114. The attachment element 114 may be a variety of elements such as a hook-and-loop fastener, a magnet, a snap connector, a button, a cavity, an adhesive, a clamp, and a threaded connection. Additionally, other types of coupling elements are contemplated. For example, attachment element 114 may be snap connectors, hook-and-loop fasteners, or threads located on the face 104 of the camera accessory mounting element 100.

As illustrated, the attachment element 114 is a cylindrical magnet, and may be a rare earth magnet. In an embodiment, the magnet 114 is removably inserted into a housing element 116. In other embodiments, the body 102 is manufactured to permanently house one or more magnets in one or more housing elements 116. Still in other embodiments, the attachment element 114 magnet is made of a flexible, elastic magnet that is incorporated into (or makes up in entirety) the body 102.

As illustrated, the two housing elements 116 protrude from the body 102. Each housing element 116 may be adapted to receive the attachment element 114. More or less housing elements may be used depending on the desired location of the attachment element 114. Location of the attachment element 114 is chosen in such a way as to enable the attachment of a peripheral device such as a grid, a light directing dish, a lens hood, a lens adaptor, a step-ring, a lens filter, a lens extension tube, a light diffuser, a light filter, and a light directing device. For example, in embodiments having magnets as the attachment elements 114, the magnets 114 will align with magnets (or another ferromagnetic material) of a peripheral device.

Figure 2A:
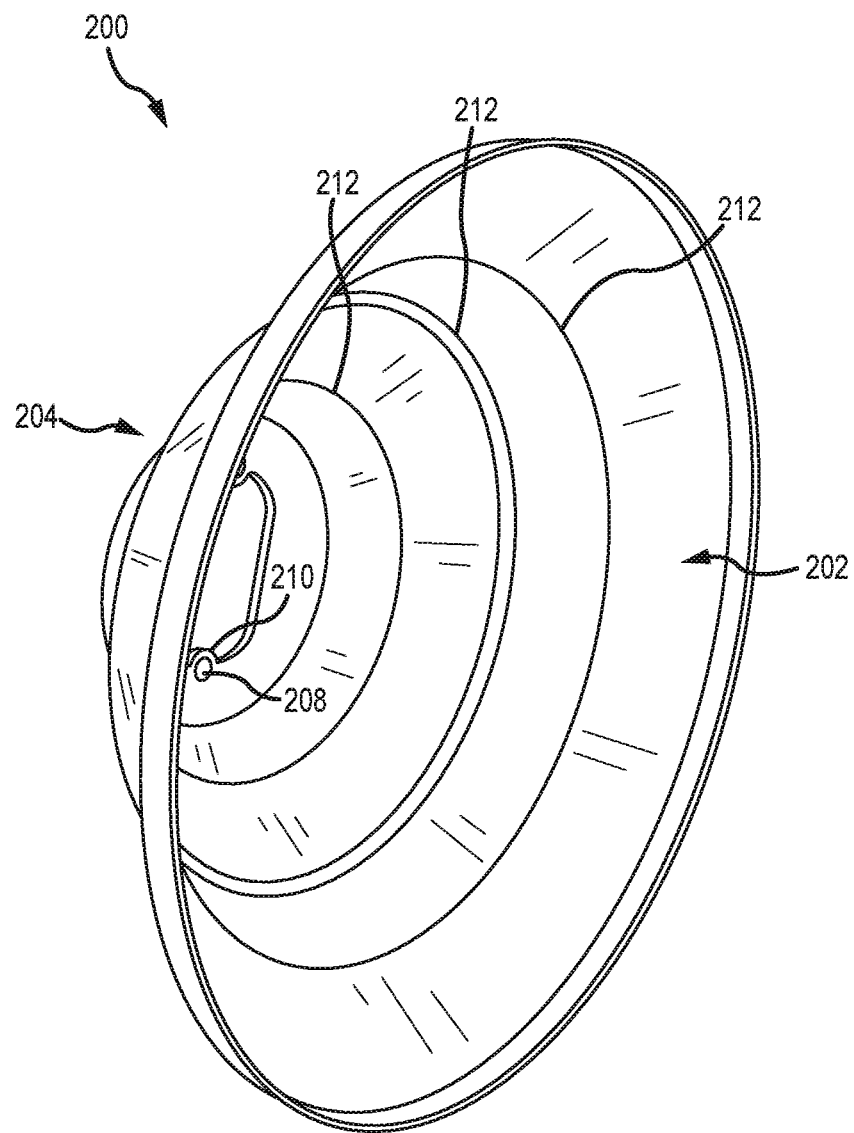
FIG. 2A illustrates a view front perspective view of an embodiment of a light directing dish.
Figure 2B:
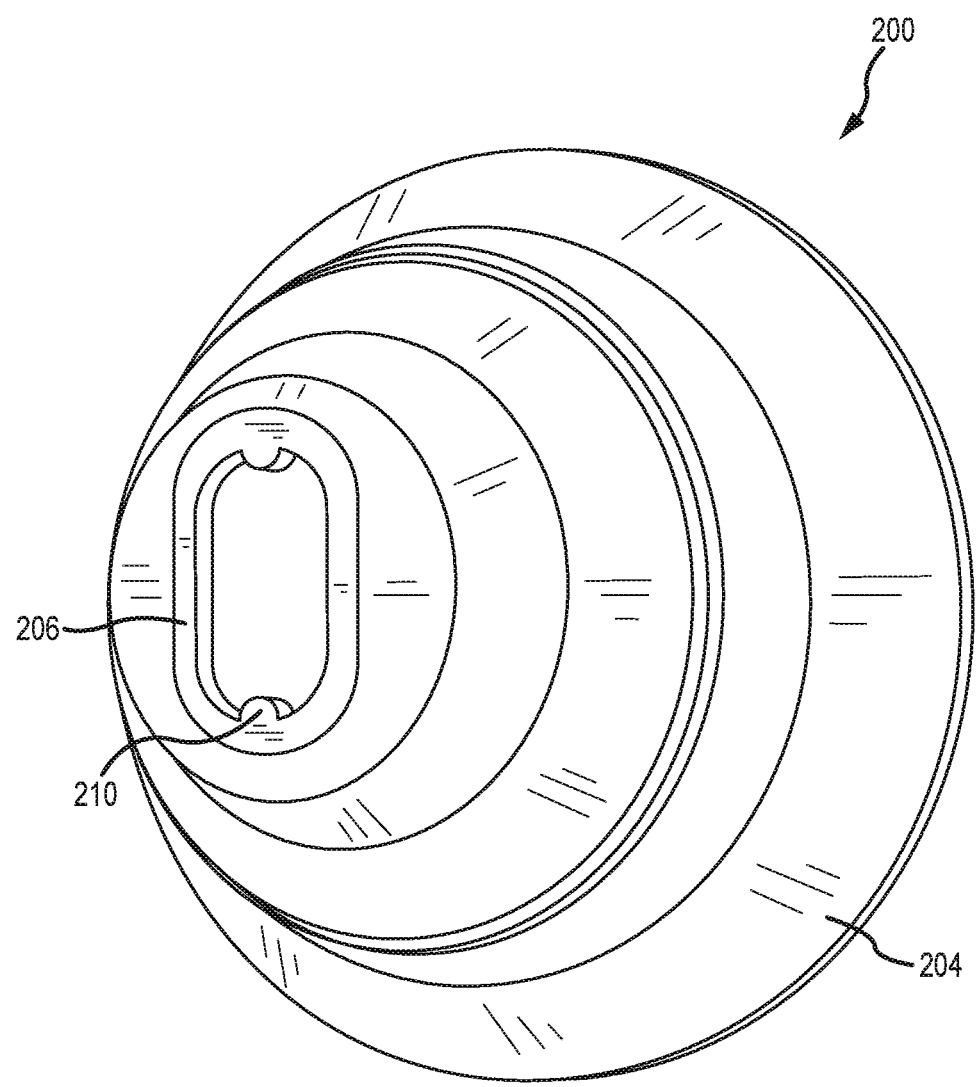
FIG. 2B illustrates a view back perspective view of an embodiment of a light directing dish.

FIGS. 2A and 2B illustrate an embodiment of a light directing dish 200. As illustrated, the light directing dish 200 is of a frustoconical shape. The dish 200 has an interior portion 202 and an exterior portion 204. Additionally, the light directing dish 200 has a dish base 206. Further, the dish base 206 has connecting elements 208 housed in connecting element housing 210.

As illustrated, the light directing dish 200 is of a unitary construction. In an embodiment, the light directing dish 200 is made of an elastic or flexible material. For example, the light directing dish 200 may be made from silicone, polyurethane, neoprene, rubber, elastomeric, elastic, elastic polymer, flexible rubber, or any other suitable material now known or later developed. In other embodiments, the light directing dish 200 is rigid. Still in others, the light directing dish 200 has portions that are flexible and portions that are rigid.

In an embodiment, the light directing dish need not be a unitary construction, but may be made of various types of materials. For example the light directing dish may have rigid elements. Such an embodiment may include rigid elements affixed to the dish base. These rigid portions may be used as connecting elements (such as, for example, hooks). Other examples include using rigid elements to provide structural support to the light directing dish.

The light directing dish 200 is collapsible in an embodiment. The dish 200 may collapse by folding along one or more bendable score lines 212. Additionally, one aspect of the current technology provides for collapse along an axis. For example, the bendable score lines 212 may be a portion of the dish that has been designed to fold. Such design may be one of thinning the material of dish 200 so that it easily bends. Other methods may be used to form bendable score lines 212. As illustrated, the bendable score lines 212 are in concentric circles.

The dish base 206 may attach to a camera accessory mounting element, such as the camera accessory mounting element described with reference to FIGS. 1A and 1B. Alternatively, the dish base 206 may attach to another peripheral device, such as a grid similar to or the same as the grid described with reference to FIG. 3. The dish base 206 may have a substantially flat surface designed to attach flush with the face of a camera attachment mounting element or another peripheral device.

The connecting elements 208 are adapted to secure the dish 200 to a camera accessory mounting element or another peripheral device. In an embodiment, connecting element 208 is a magnet. A magnet may be of any shape, and may be removable and stored in the dish base 206. For example, the magnets may be of cylindrical shape and may be removably inserted into a connecting element housing 210. In other embodiments, there may be a ring shaped magnet that is embedded in the base such that it is not readily removed. In another embodiment, the magnet may be a flexible magnet incorporated into or on the dish base 206.

In other embodiments, the connecting element 208 may be a variety of elements such as a hook-and-loop fastener, a snap connector, a button, a cavity, an adhesive, a clamp, and a threaded connection. For example, a hook-and-loop fastener may be placed on the dish base 206, and may be designed to attach to a hook-and-loop fastener placed on the face of a camera accessory mounting element or a grid. Additionally, other types of connecting elements are contemplated.

Figure 3:
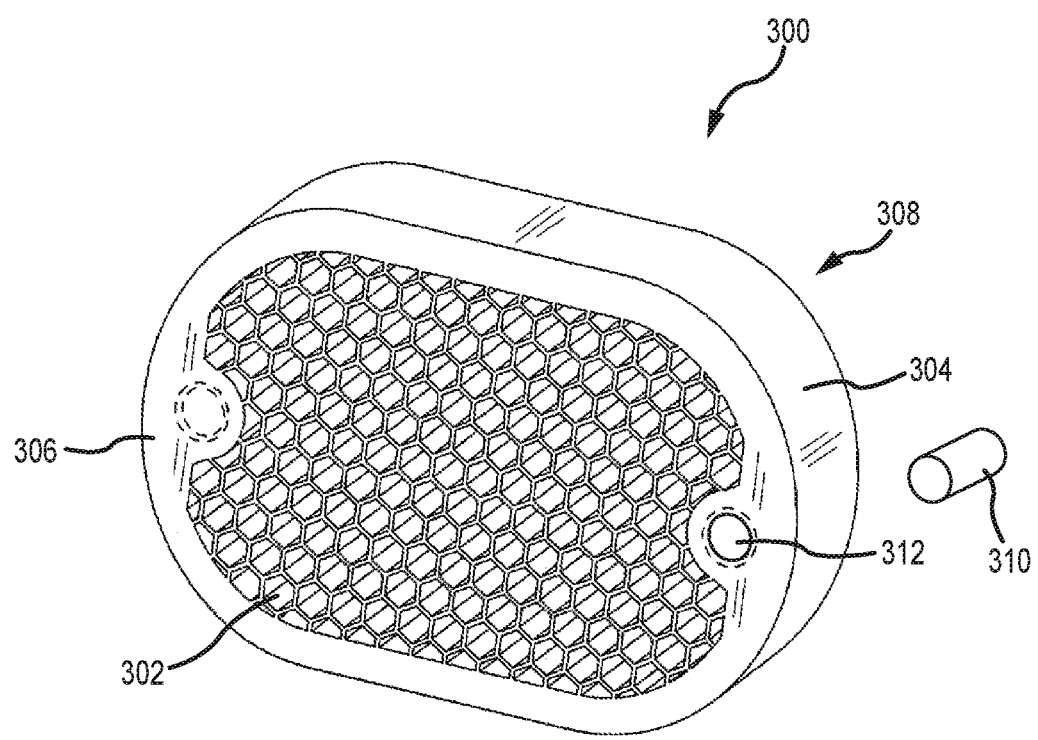
FIG. 3 illustrates an embodiment of a grid peripheral device.

FIG. 3 illustrates an embodiment of a grid peripheral device 300. As illustrated, the grid peripheral device 300 has a grid pattern 302, a side ridge 304, a grid face 306, a grid base 308, an attachment element 310, and an attachment element housing 312.

In an embodiment, the grid peripheral device 300 is of a unitary construction. For example, the grid peripheral device 300 may be made of an elastic or flexible material. For example, the grid peripheral device 300 may be made from silicone, polyurethane, neoprene, rubber, elastomeric, elastic, elastic polymer, flexible rubber, or any other suitable material now known or later developed. In other embodiments, the grid peripheral device 300 is made of a rigid plastic. Still in others, the grid peripheral device 300 has portions that are flexible and portions that are rigid.

In an embodiment, the grid peripheral device need not be a unitary construction, but may be made of various types of materials. For example the grid pattern of the grid peripheral device may be of a rigid material. Additionally, the grid face and the grid base may have affixed upon them attachment elements that are rigid (such as, for example, hooks for a hook-and-loop attachment element scheme). Other examples include using rigid elements to provide structural support to the grid peripheral device 300.

The grid base 308 may attach to a camera accessory mounting element, such as the camera accessory mounting element described with reference to FIG. 1A. Alternatively, the grid base 308 may attach to another peripheral device such as a second grid peripheral device 300, or another device. The grid base 308 may have a substantially flat surface designed to be secured flush with the face of a camera attachment mounting element or another peripheral device.

The grid face 306 faces away from the camera accessory mounting element. The grid face 306 may attach to another peripheral device. For example, the grid face 306 may attach to a dish base with the aid of attachment element 310.

The attachment elements 310 are adapted to secure the grid peripheral device 300 to a camera accessory mounting element, such as the camera accessory mounting element as described in FIG. 1A. Additionally, the attachment elements 310 may secure one or more peripheral devices. The attachment elements 310 may be magnets. The magnets may be of any shape, and may be removable and stored in the grid peripheral device 310. For example, the magnets may be of cylindrical shape and may be removably inserted into an attachment element housing 312.

In other embodiments, the attachment element 310 may be one or more attachment elements such as hook-and-loop fastener, a magnet, a snap connector, a button, a cavity, an adhesive, a clamp, and a threaded connection. Additionally, other types of attachment means are contemplated. For example, attachment elements 310 may be snap connectors, hook-and-loop fasteners, or threads located on the grid face 306 or grid base 308.

Figure 4A:
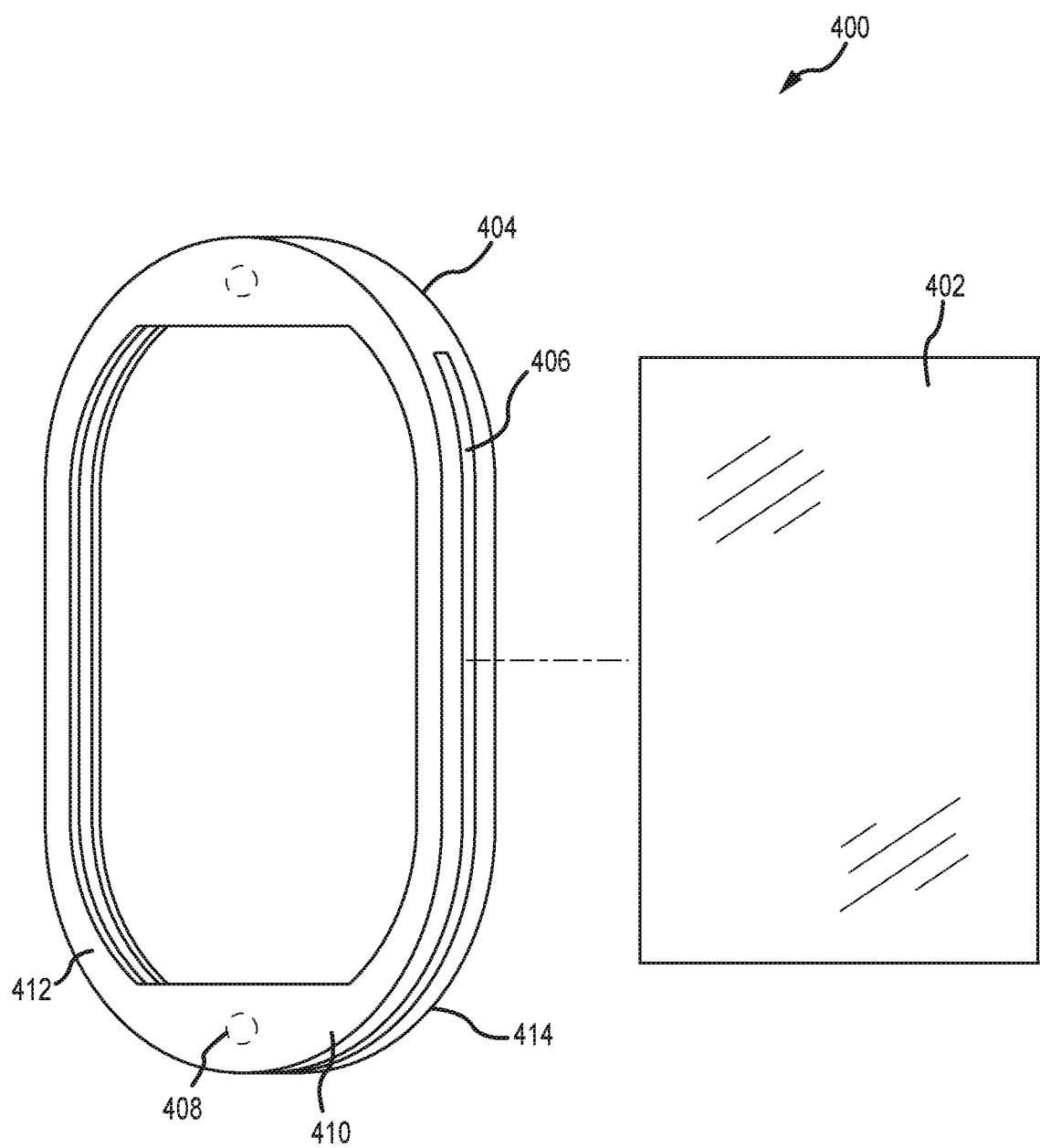
FIG. 4A illustrates a front perspective view of an embodiment of a light filter peripheral device.
Figure 4B:
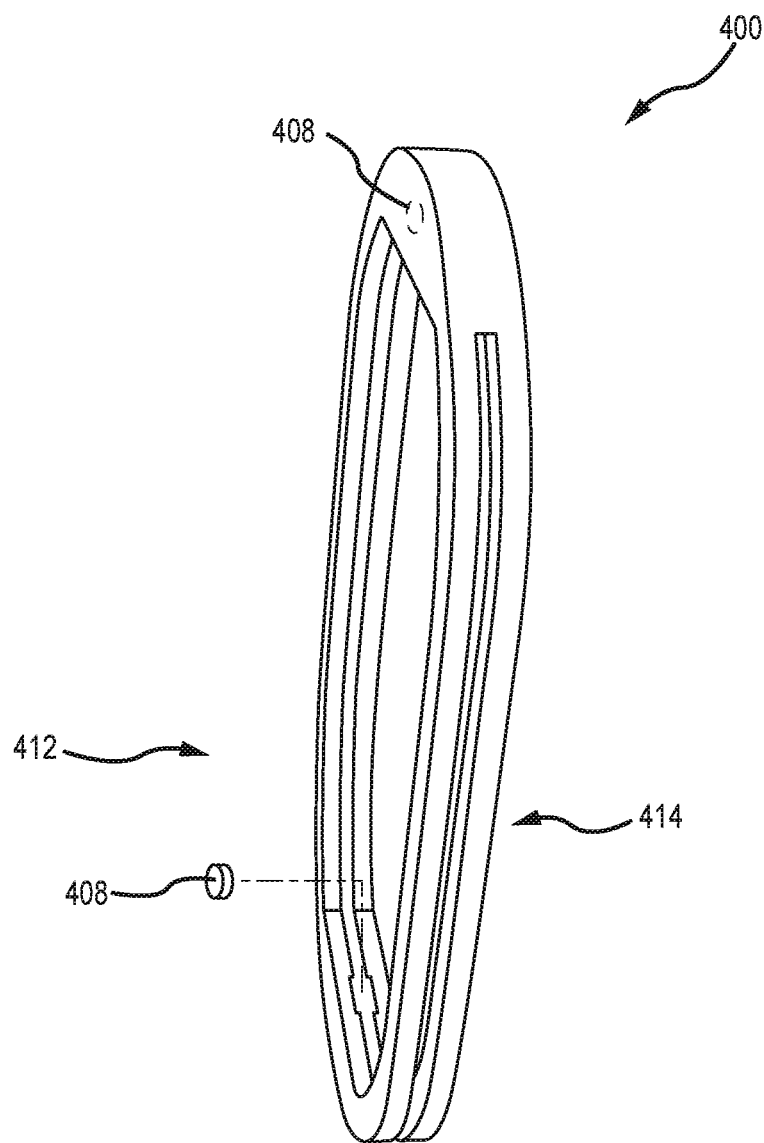
FIG. 4B illustrates a side perspective view of an embodiment of a light filter peripheral device.

FIGS. 4A and 4B illustrate an embodiment of a light filter peripheral device 400. As illustrated, a light filter peripheral device 400 includes a light filter 402, a light filter body 404. The light filter body 404 has a filter receiving slot 406 and an attachment element 408. FIG. 4A depicts an attachment element housing 410.

The light filter 402 may be a transparent or translucent object. Other shapes may be used. For example, the light filter 402 may have optical reflectance or refractive properties. The light filter may be made of glass, plastic, a transparent or translucent polymer, or any other material now known or later developed.

In an embodiment, the light filter body 404 is of a unitary construction. In an embodiment, the light filter body 404 is made of an elastic or flexible material. For example, the light filter body 404 may be made from silicone, polyurethane, neoprene, rubber, elastomeric, elastic, elastic polymer, flexible rubber, or any other suitable material now known or later developed. In other embodiments, the light filter body 404 is made of a rigid plastic. Still in others, the light filter body 404 has portions that are flexible and portions that are rigid.

In an embodiment, the light filter body need not be a unitary construction, but may be made of various types of materials. A face and/or base of the light filter peripheral device may have attachment elements that are rigid. These rigid portions may be used as an attachment element (such as, for example, hooks). Other examples include using rigid elements to provide structural support to the light filter peripheral device.

The light filter body 404 is adapted to receive the light filter 402. In an embodiment, this occurs by the light filter 404 being placed into a filter receiving slot 406. The filter receiving slot 406 removably receives the light filter 402. In another embodiment, the light filter 402 is permanently housed in the light filter body 404.

The base 414 of the light filter body may attach to a camera accessory mounting element, such as the camera accessory mounting element described with reference to FIG. 1A. Alternatively, the base 414 may attach to another peripheral such as a grid or another light filter peripheral device. The base 414 may have a substantially flat surface designed to be secured flush with the face of a camera attachment mounting element or another peripheral device.

The face 412 faces away from the camera accessory mounting element. The face 412 may attach to another peripheral device. For example, the face 412 may attach to a dish base with the aid of attachment element 408.

The attachment elements 408 are adapted to secure a light filter peripheral device 400 to a camera accessory mounting element, such as the camera accessory mounting element as described in FIG. 1A or 1B. Additionally, the attachment elements 408 may secure one or more peripheral devices.

The attachment elements 408 may be magnets. The magnets may be of any shape, and may be removable and stored in the light filter body 404. For example, the magnets may be of cylindrical shape and may be removably inserted into an attachment element housing 410.

In other embodiments, the attachment element 408 may be one or more attachment means such as hook-and-loop fastener, a magnet, a snap connector, a button, a cavity, an adhesive, a clamp, and a threaded connection. Additionally, other types of attachment means are contemplated. For example, attachment elements 408 may be snap connectors, hook-and-loop fasteners, or threads located on the face 412 or base 414.

Figure 5:
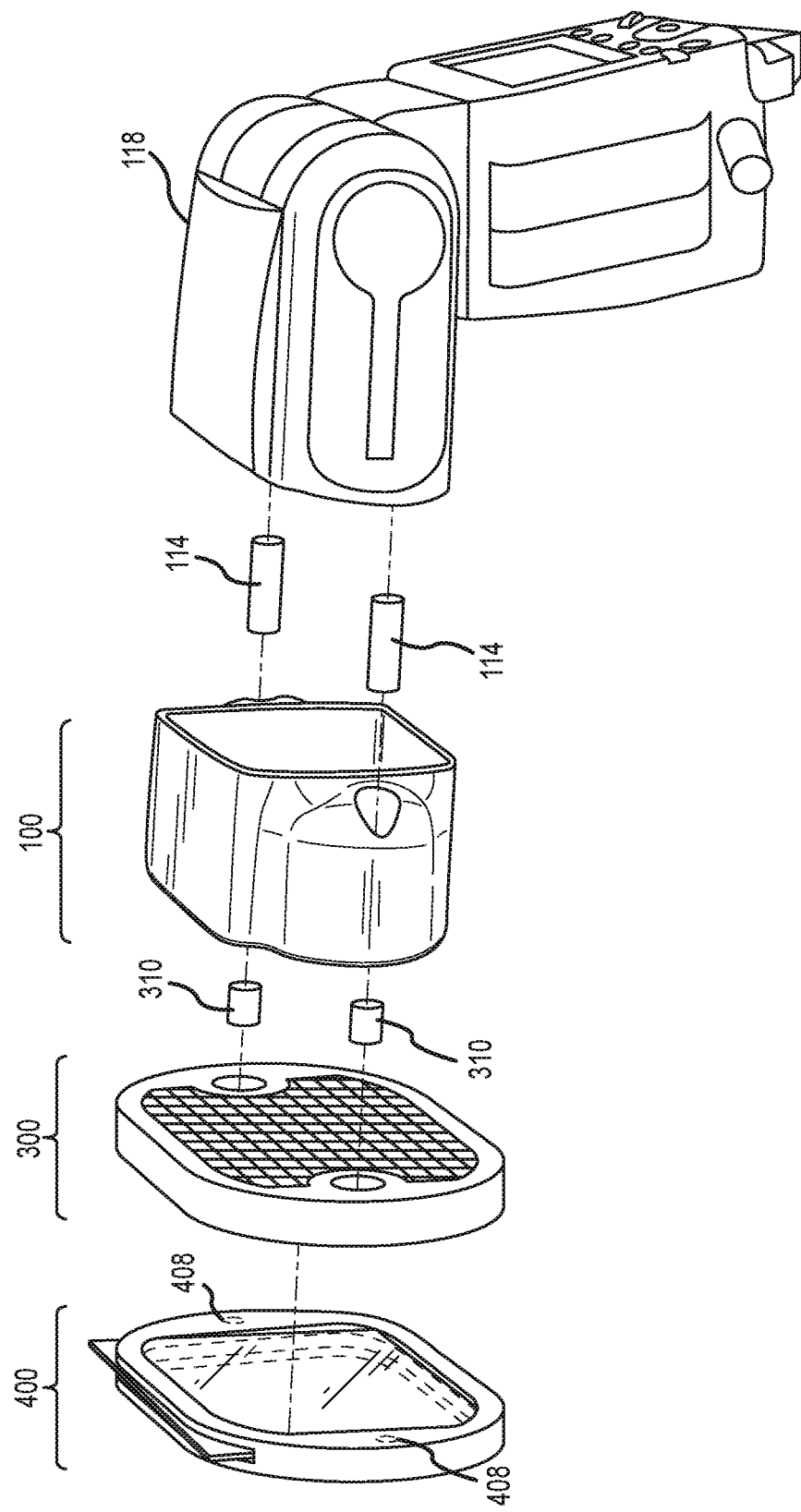
FIG. 5 illustrates an exploded view of multiple peripheral devices attached to a camera component using a camera accessory mounting element.
Figure 6:
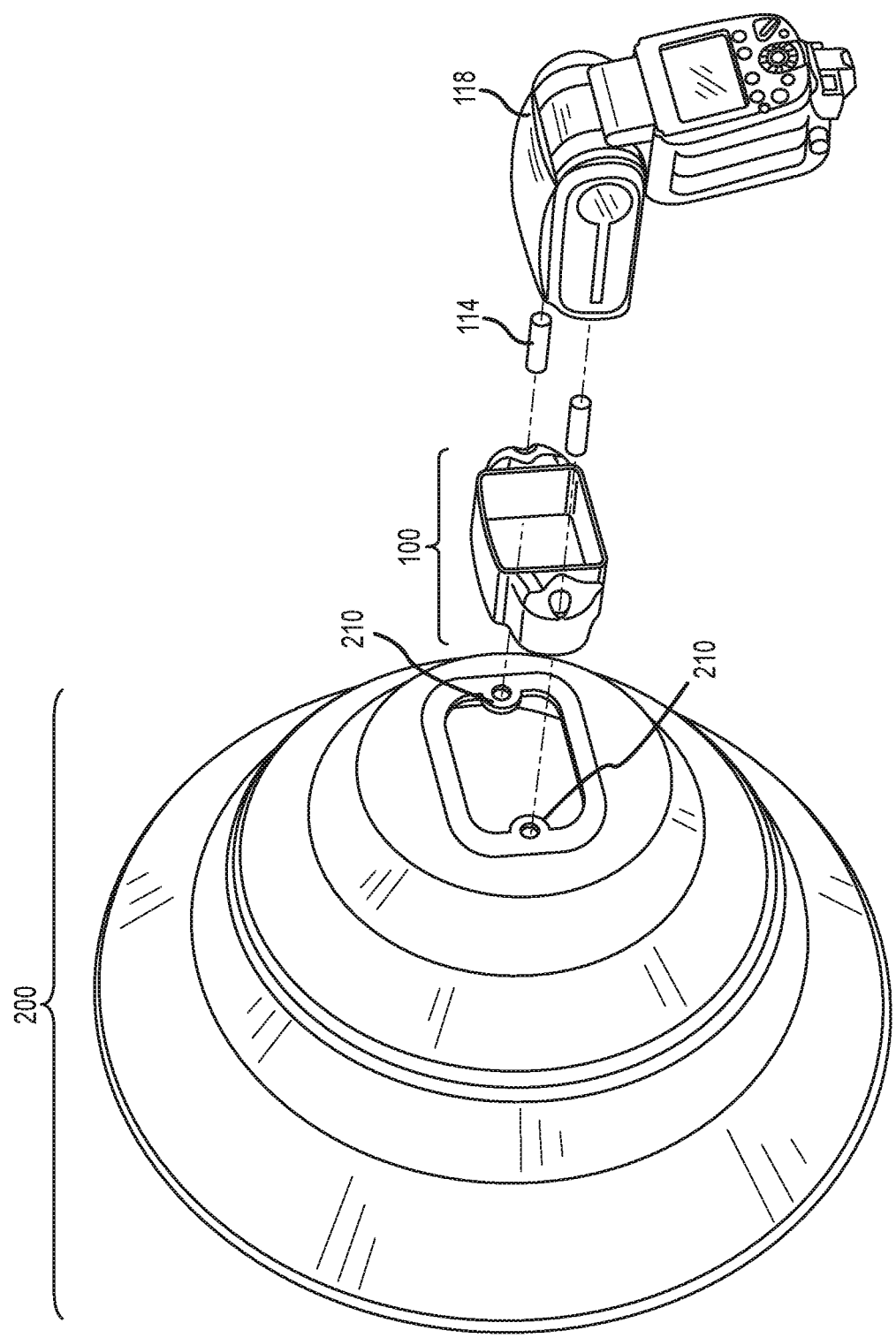
FIG. 6 illustrates an exploded view of a light-directing dish attached to a camera component using a using a camera accessory mounting element.

FIGS. 5 and 6 represent embodiments of a system for attaching one or more peripheral devices to a camera component. FIG. 5 illustrates an embodiment of attaching a grid peripheral device 300 and a light filter peripheral device 400 to a camera component using a camera accessory mounting element 100. As illustrated, a camera accessory mounting element 100 is mounted on a camera component 118. The camera accessory mounting element 100 may be stretched so as to be mounted to the camera component 118. Attachment elements 114 are placed in the camera accessory mounting element 100. The attachment elements 114 are aligned with attachment element 310 of a grid peripheral device 300. Additionally, aspects of the current technology provide that attachment element 310 aligns with attachment element 408.

In an embodiment, attachment elements may be magnets. In such an embodiment, a user may place the grid peripheral device 300 in proximity to the camera accessory mounting element 100. The magnetic attraction between the attachment elements 310 and the attachment elements 114 will secure the grid peripheral device 300 to the camera accessory mounting element 100.

A light filter peripheral device 400 is similarly attached to the grid peripheral device 300. Attachment elements of the grid peripheral device 300 align with attachment elements of the peripheral device 400. For example, the grid peripheral device 300 may have attachment elements 310 that are magnets and attach to ferrous magnetic material of a light filter peripheral device 400, such as an attachment element 408. In one aspect, the light filter peripheral device 400 may include simple magnets similar to magnets 310.

FIG. 6 illustrates an embodiment of attaching a light directing dish 200 and a camera component 118 using a camera accessory mounting element 100. As illustrated, a camera accessory mounting element 100 is mounted on a camera component 118. Mounting may occur by stretching the camera accessory mounting element 100 over the camera component 118. Attachment elements 114 are placed in the camera accessory mounting element 100. The attachment elements 114 are aligned with attachment elements of a light directing dish 200.

In an embodiment, attachment elements may be magnets. In such an embodiment, a user may place the light directing dish 200 in proximity to the camera accessory mounting element 100. The magnetic attraction between the attachment elements and the attachment elements 114 will secure the light directing dish to the to the camera accessory mounting element 100.

While FIGS. 5 and 6 illustrate specific peripheral devices being attached to a camera component in a particular order, it will be appreciated that the order and types of peripheral devices that may be attached may vary. For example, a user may attach a light filter, a grid, and a dish to a camera component using a camera accessory mounting element. Alternatively, a user may attach multiple grids to a camera component using a camera accessory mounting element.

Figure 7:
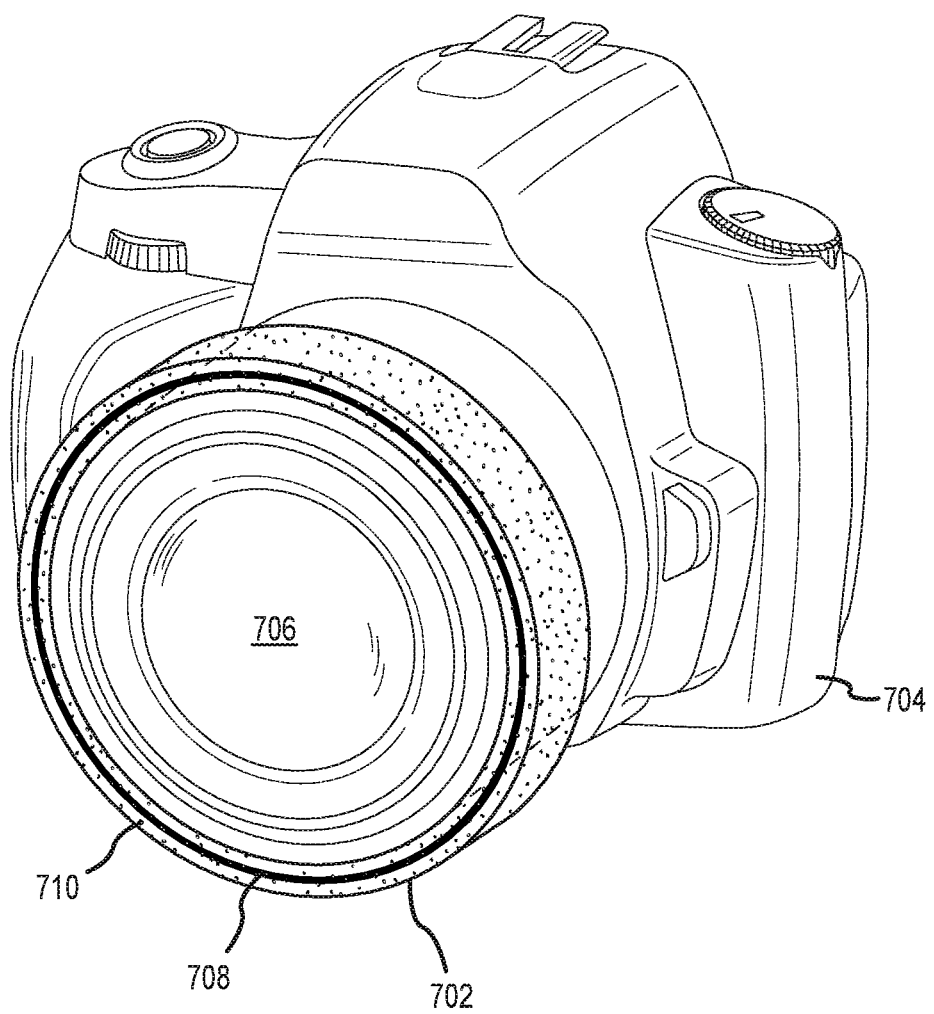
FIG. 7 illustrates camera accessory mounting element attached to a lens of a camera.

FIG. 7 illustrates camera accessory mounting element 702 attached to a lens 706 of a camera 704. In an embodiment, the camera accessory mounting element 702 is of a unitary construction. For example, the camera accessory mounting element 702 may be made of an elastic or flexible material. For example, the camera accessory mounting element 702 may be made from silicone, polyurethane, neoprene, rubber, elastomeric, elastic, elastic polymer, flexible rubber, or any other suitable material now known or later developed. In other embodiments, the camera accessory mounting element 702 is made of a rigid plastic. Still in others, the camera accessory mounting element 702 has portions that are flexible and portions that are rigid.

Camera accessory mounting element 702 has attachment element 708. As illustrated, attachment element 708 is a magnetized race that is disposed on the face 710 of the attachment element 702. In other embodiments, the attachment element 708 may be a variety of elements such as a hook-and-loop fastener, a magnet, a snap connector, a button, a cavity, an adhesive, a clamp, and a threaded connection. Additionally, other types of coupling elements are contemplated. For example, attachment element 708 may be snap connectors, hook-and-loop fasteners, or threads located on the face 708 of the camera accessory mounting element 702.

Camera accessory mounting element 702 is attached to a lens 706. The attachment element 708 is adapted to couple all manner of peripheral devices to the lens. This may include light filters, lens hoods, telescopic lenses, etc. In other embodiments, the camera accessory mounting element 702 may attach to a lens mount, allowing the quick change of one or more lenses. Attaching the camera accessory mounting element 702 mounting element to the camera 706 may occur by stretching camera accessory 702 around the lens of a camera.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components and individual functions can be distributed among different components. In this regard, any number of the features of the different embodiments described herein may be combined into one single embodiment and alternate embodiments having fewer than or more than all of the features herein described as possible.

While various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

I claim:

1. A light directing system comprising:
   an apparatus having a face and an apparatus opening, wherein the apparatus is coupled to a light producing element of a camera such that light may be directed through the apparatus opening;
   a first additional device comprising:
      a body having a first base opposite a first face, the body defining at least one opening from the first base to the first face through which visible light is capable of passing, wherein the first base is removably coupled to the apparatus face such that the first base and the apparatus face are substantially flush and at least a portion of the apparatus opening overlaps with at least a portion of the at least one opening; and
   a second additional device comprising a second base that is magnetically coupled to the first face.

2. The light directing system of claim 1, wherein the apparatus face is magnetically coupled to the first base.

3. The light directing system of claim 1, wherein the first face and the second base are magnetically coupled.

4. The light directing system of claim 3, wherein the second additional device comprises a second opening, and further where the second base and the first face are substantially flush such that at least a portion of the second opening overlaps with at least a portion of the at least one opening.

5. The light directing system of claim 3, wherein the body of the first additional device is a light filter body in which a light filter is permanently housed in at least a portion of the at least one opening.

6. The light directing system of claim 3, wherein the second additional device comprises:
a frustoconical hollow body extending between the second base and the light directing end, wherein
an interior portion of the frustoconical hollow body is configured to direct light from the second base to the light directing end.

7. The light directing system of claim 1, wherein the first additional device comprises a lens filter body adapted to receive a lens filter, wherein the lens filter body defines the first base.

8. The light directing system of claim 7 wherein the lens filter body is made of a rigid plastic.

9. The light directing system of claim 7 wherein the lens filter is a translucent filter.

10. The light directing system of claim 1, wherein the apparatus is removably coupled to the light producing element of a camera.

11. A light directing system comprising:
a light producing element with a body having a light face, the light producing element associated with a camera;
an apparatus, having an apparatus opening, the apparatus removably coupled to the body of the light producing element, wherein the apparatus includes an apparatus face through which the apparatus opening passes on an apparatus plane that is substantially parallel with the light face; and
a first additional device removably coupled to the apparatus, the first additional device comprising a first opening and a first base on a first plane, the first plane substantially parallel to the apparatus plane, wherein the first opening and the apparatus opening are aligned such that light from the light producing element is capable of passing.

12. The light directing system of claim 11, the system further comprising:
a second additional device removably coupled to the first additional device, the second additional device comprising a second base on a second plane, the second plane substantially parallel to the first plane.

13. The light directing system of claim 12, the first additional device further comprising a first face disposed opposite the first base, and wherein the second base is removably coupled to the first face of the first additional device face.

14. The light directing system of claim 13, wherein the first face and the second base are capable of forming a magnetic coupling.

15. The light directing system of claim 11, wherein the apparatus is removably coupled to the body of the light producing element by at least one portion of the apparatus elastically deforming about the body of the light producing element.

16. The light directing system of claim 11, wherein the apparatus face and the first base are capable of forming a magnetic coupling.

17. The light directing system of claim 11, wherein the first additional device is a grid, the grid including a body having a grid pattern.

18. The light directing system of claim 11, wherein the first additional device comprises a lens filter body adapted to receive a lens filter, wherein the lens filter body defines the first additional device base.

19. A light directing system comprising:
a light producing element with a body having a light face, the light producing element associated with a camera;
an apparatus comprising:
a body defining an apparatus opening, the body having an apparatus face through which the opening passes, wherein
the apparatus face is on an apparatus plane that is substantially parallel with the light face; and
a first additional device with a first base and a first opening on a first plane, wherein the first base is magnetically coupled to the apparatus face such that the first plane is substantially parallel to the apparatus plane and the first opening and the apparatus opening at least partially overlap.

20. The light directing system of claim 19, wherein the first additional device further comprises a first face opposite the first base, and wherein the system further comprises:
a second additional device with a second base on a second plane, wherein the second base is magnetically coupled to the first face such that the second plane is substantially parallel to the first plane.

21. The light directing system of claim 20, wherein the first additional device and the second additional device are each one of: a light filter or a grid.

\* \* \* \* \*